US008557917B2

(12) United States Patent
Leskinen et al.

(10) Patent No.: US 8,557,917 B2
(45) Date of Patent: Oct. 15, 2013

(54) METHOD TO PRODUCE VERY STIFF POLYPROPYLENE

(75) Inventors: Pauli Leskinen, Helsinki (FI); Michiel Bergstra, Berchem (BE)

(73) Assignee: Borealis AG, Vienna (AT)

( * ) Notice: Subject to any disclaimer, the term of this patent is extended or adjusted under 35 U.S.C. 154(b) by 194 days.

(21) Appl. No.: 12/998,263

(22) PCT Filed: Oct. 6, 2009

(86) PCT No.: PCT/EP2009/062946
§ 371 (c)(1),
(2), (4) Date: Mar. 31, 2011

(87) PCT Pub. No.: WO2010/040732
PCT Pub. Date: Apr. 15, 2010

(65) Prior Publication Data
US 2011/0174415 A1    Jul. 21, 2011

(30) Foreign Application Priority Data
Oct. 8, 2008  (EP) .................................... 08166131

(51) Int. Cl.
C08F 10/06 (2006.01)
C08F 210/06 (2006.01)
C08F 2/38 (2006.01)
C08F 210/16 (2006.01)
C08F 110/06 (2006.01)

(52) U.S. Cl.
USPC ............. 525/53; 525/240; 525/242; 525/245; 525/247; 525/322; 526/65; 526/78; 526/79; 526/82; 526/348; 526/351

(58) Field of Classification Search
USPC .................. 525/53, 240, 242, 245, 247, 322; 526/65, 78, 79, 82, 348, 351
See application file for complete search history.

(56) References Cited

U.S. PATENT DOCUMENTS

| 3,472,829 | A | 10/1969 | Claybaugh et al. | |
| 6,300,420 | B1 * | 10/2001 | Jaaskelainen et al. | 525/240 |

FOREIGN PATENT DOCUMENTS

| DE | 199 30 594 A1 | | 1/2001 |
| EP | 0 704 463 | | 4/1996 |
| WO | WO 87/07620 | | 12/1987 |
| WO | WO 91 14718 | | 10/1991 |
| WO | WO 92/21705 | | 12/1992 |
| WO | WO 93/11165 | | 6/1993 |
| WO | WO 93/19100 | | 9/1993 |
| WO | WO 96/11216 | | 4/1996 |
| WO | WO 97/36939 | | 10/1997 |
| WO | WO 98/12234 | | 3/1998 |
| WO | WO 99/03897 | * | 1/1999 |
| WO | WO 99/33842 | | 7/1999 |
| WO | WO 99/58587 | | 11/1999 |
| WO | WO 01/49751 | | 7/2001 |
| WO | WO 03/000754 A1 | | 1/2003 |
| WO | WO 03/000757 A1 | | 1/2003 |
| WO | WO 2004/029112 A1 | | 4/2004 |
| WO | WO 2005/049663 | | 6/2005 |

OTHER PUBLICATIONS

Ali et al; "Molecular Weight Distribution Broadening of Polypropylene by Periodic Switching of Hydrogen and Catalyst Additions"; Journal of Applied Polymer Science, vol. 108, pp. 2446-2457; 2008 Wiley Periodicals, Inc.

* cited by examiner

*Primary Examiner* — Roberto Rabago
(74) *Attorney, Agent, or Firm* — Warn Partners, P.C.

(57) ABSTRACT

The present invention relates to a process for the preparation of a propylene homo- or copolymer, comprising the following steps: (i) feeding propylene and hydrogen, and optionally one or more comonomers, to a reactor R1, wherein the hydrogen is fed to the reactor R1 in a periodically varying amount, (ii) preparing a first fraction of the propylene homo- or copolymer in the reactor R1 in the presence of a catalyst, (iii) transferring the first fraction to a reactor R2, and (iv) preparing a second fraction of the propylene homo- or copolymer in the reactor R2, wherein the melt flow rate MFR (2.16 kg, 230° C.) of the propylene homo- or copolymer is higher than the melt flow rate MFR (2.16 kg, 230° C.) of the first fraction.

25 Claims, No Drawings

METHOD TO PRODUCE VERY STIFF POLYPROPYLENE

This application is a National Stage of International Application No. PCT/EP2009/062946, filed Oct. 6, 2009. This application claims priority to European Patent Application No. 08166131.6 filed on Oct. 8, 2008. The disclosures of the above applications are incorporated herein by reference.

The present invention relates to a process for the preparation of polypropylene with high stiffness and a polypropylene obtainable by said process.

Polypropylene has many characteristics which makes it useful for applications ranging from food packaging (film, bottle) to more demanding applications like pipes, fittings, or foams.

Polypropylene as a piping material is mainly used in non-pressure applications (pipes and fittings) and profiles. However, it is also used for pressure pipes, mainly hot water and industrial pipes. High thermal resistance of polypropylene, if compared to other polyolefins, is one of the relevant properties which makes it suitable for pipe applications. All three main types of propylene polymers, i.e. homopolymers, random copolymers and block copolymers are used.

Homopolymers provide high rigidity but impact and creep properties are low. Block copolymers provide beneficial impact properties whereas the creep properties are comparable to those of propylene homopolymers. Propylene random copolymers are used for pressure pipe applications such as hot water and industrial pipes since they have improved creep resistance compared to propylene homopolymers and block copolymers.

It is desired that propylene polymers to be used for the preparation of pipes have high stiffness.

A process for the production of a propylene/alpha-olefin copolymer having improved stiffness is disclosed in WO 96/11216.

Processability of conventional propylene polymers can be improved by broadening the molecular weight distribution (MWD) in a multi-stage polymerisation process wherein polymers which differ in average molecular weight are produced in each stage. A multi-stage polymerisation process is disclosed e.g. in patent application WO 91/14718.

As indicated above, broadening of the MWD can be accomplished by using a multi-stage polymerisation process wherein two or more reactors are provided in serial configuration and each reactor is operated at different polymerisation conditions. In an alternative approach to the multistage reactor technology, it is also known to broaden MWD by varying polymerisation conditions within a single reactor.

DE 199 30 594 A1 discloses a process for the preparation of a polyolefin, in particular polyethylene, having a broad molecular weight distribution or comonomer polydispersity, wherein at least one process parameter such as comonomer concentration, hydrogen concentration, or temperature is periodically varying.

M. Al-Haj Ali et al., Journal of Applied Polymer Science, Vol. 108, pp. 2446-2457 (2008), discuss broadening of molecular weight distribution of polypropylene by periodic switching of hydrogen and/or catalyst feed.

U.S. Pat. No. 3,472,829 discloses a process for the preparation of polypropylene, wherein the average molecular weight of the polymer is controlled by introducing hydrogen into the reactor at a predetermined varying rate during repeated cycles.

However, periodically varying process parameters within a single reactor may adversely affect catalyst activity and productivity. As an example, significantly decreasing the amount hydrogen fed to the reactor may result in low catalyst productivity.

As already indicated above, high stiffness is an important property of polypropylene materials used for pipes, in particular pressure pipes, which in turn enables the production of pipes with thinner walls and, consequently, larger internal pipe diameter. However, an improvement of stiffness should not be achieved on the expense of polymer production rate.

Thus, considering the statements made above, it is an object of the present invention to provide a process for the preparation of polypropylene with high stiffness, while still maintaining process productivity on a high level.

It is also an object of the present invention to provide a polypropylene having high stiffness, and being useful for the preparation of pipes, such as water pressure pipes.

The object is solved by a process for the preparation of a propylene homo- or copolymer, comprising the following steps:
(i) feeding propylene and hydrogen, and optionally one or more comonomers, to a reactor R1, wherein the hydrogen is fed to the reactor R1 in a periodically varying amount,
(ii) preparing a first fraction of the propylene homo- or copolymer in the reactor R1 in the presence of a catalyst,
(iii) transferring the first fraction to a reactor R2, and
(iv) preparing a second fraction of the propylene homo- or copolymer in the reactor R2,
wherein the melt flow rate MFR (2.16 kg, 230° C.) of the propylene homo- or copolymer is higher than the melt flow rate MFR (2.16 kg, 230° C.) of the first fraction.

In step (i) of the process according to the present invention, the hydrogen is fed to the reactor R1 in a periodically varying amount. Thus, the amount of hydrogen in the feed stream to the reactor R1 varies as a function of time and, as a consequence thereof, the concentration of hydrogen within the reactor R1 is periodically varying as well. However, as will be described in further detail below, the periodic variation in the feed stream might be different from the one in the reactor as the chemical system might need some time to react to the modified input. As an example, the amount of hydrogen fed to the reactor may vary in the form of a rectangular function (i.e. periodically switching on/off the hydrogen feed) whereas the hydrogen concentration within the reactor may vary in the form of a sinusoidal function.

In a preferred embodiment, a prepolymerisation step in a prepolymerisation reactor is carried out before step (i), wherein the prepolymerisation step includes feeding propylene and hydrogen, and optionally comonomers such as ethylene and/or C4 to C12 alpha-olefins, to the prepolymerisation reactor, wherein the hydrogen feed is provided in a periodically varying amount. Any conventional type of reactor which is commonly used as a prepolymerisation reactor can be selected. Preferably, the prepolymerisation reactor is a continuous stirred reactor. More preferably, the prepolymerisation reactor is a slurry reactor such as a loop reactor. However, it is also possible to use other types of reactors, e.g. a continuous stirred tank reactor (CSTR).

If a prepolymerisation step is carried out before step (i), the first fraction of step (ii) also includes the propylene prepolymer prepared in the prepolymerisation reactor and subsequently transferred to the reactor R1.

As the hydrogen feed to the prepolymerisation reactor is periodically varying, there is also a periodical variation of the hydrogen concentration within the prepolymerisation reactor. Furthermore, when continuously transferring the hydrogen and the prepolymer from the prepolymerisation reactor to the reactor R1, which is preferably a slurry reactor such as a loop reactor, a periodically varying hydrogen feed to the reactor R1 is obtained. In other words, in a preferred embodiment comprising a prepolymerisation reactor, the periodically varying hydrogen feed to the reactor R1 results from periodic hydrogen feed variations already generated in the prepolymerisation reactor.

In addition to the hydrogen feed coming from the prepolymerisation reactor, there might be a second hydrogen feed from another hydrogen source to the reactor R1. However, in a preferred embodiment, the hydrogen which is fed to the reactor R1 is exclusively provided from the prepolymerisation reactor.

Preferably, the amount of hydrogen in the feed stream(s) to the reactor R1 and/or the prepolymerisation reactor varies/vary as a function of time in the form of a non-sinusoidal function, preferably in the form of a sawtooth function, a triangle function, a rectangular function, one or more pulse functions, one or more step functions, or any combination thereof.

Preferably, the periodic variation is accomplished by periodically switching on/off the feed stream(s) to the reactor R1 and/or the prepolymerisation reactor, thereby resulting in a periodic variation which can be described by a rectangular function and/or a pulse function.

Alternatively, it may be preferred that the amount of hydrogen in the feed stream(s) to the reactor R1 and/or prepolymerisation reactor varies/vary as a function of time in the form of a sinusoidal function.

As already indicated above, the term "periodically varying amount" means that the amount of hydrogen in the feed stream to the reactor R1, and optionally to the prepolymerisation reactor, varies as a function of time. Thus, within a periodic cycle there is a time segment t1 in which a relatively higher amount of hydrogen is fed to the reactor, followed by a time segment t2 with a relatively lower amount or even a zero feed of hydrogen (wherein t1+t2 correspond to the duration of one periodic cycle). Both time segments can be of equal length (symmetric periodicity) or can differ (asymmetric periodicity).

In a preferred embodiment, the periodically varying hydrogen feed to the reactor R1, and optionally to the prepolymerisation reactor, is of asymmetric periodicity. Preferably, t2>t1.

Preferably, the hydrogen is fed to the reactor R1 and/or the prepolymerisation reactor pulse-wise, wherein within a periodic cycle, the duration of the hydrogen pulse is $t_p$ and the duration of the hydrogen zero feed is $t_{zf}$ and $t_p<t_{zf}$. In a preferred embodiment, $t_p$ and $t_{zf}$ satisfy the following relationship:

$$1/30 \leq (t_p/t_{zf}) < 1.$$

More preferably, the relationship is as follows: $1/20 \leq (t_p/t_{zf}) < 0.9$. Even more preferably, the relationship is as follows: $1/10 \leq (t_p/t_{zf}) < 0.8$.

The term "hydrogen zero feed" means that no hydrogen is fed to the reactor.

In a preferred embodiment, the hydrogen is fed to the reactor R1 and/or the prepolymerisation reactor pulse-wise, wherein $t_p$ is within the range of 1 to 15 minutes, more preferably 2 to 10 minutes, even more preferably 3 to 8 minutes, preferably with an average hydrogen to propylene feed ratio of from 0.002 to 0.022 mol/kmol, more preferably of from 0.005 to 0.020 mol/kmol, and $t_{zf}$ is within the range of 5 to 40 minutes, more preferably 10 to 35 minutes, even more preferably 10 to 25 minutes.

In case a propylene copolymer is prepared by the process of the present invention, comonomers selected from ethylene, C4 to C12 alpha-olefins, or any combinations thereof can be fed to the reactor R1 and optionally to the prepolymerisation reactor. In a preferred embodiment, a propylene homopolymer is prepared by the process of the present invention.

Preferably, the oscillation period $t_{OP-1}$ of the varying hydrogen feed to the reactor R1 is from 10 minutes to 60 minutes, more preferably 10 minutes to 40 minutes.

Preferably, the average residence time $t_{RT-1}$ in the reactor R1 is from 10 minutes to 90 minutes, more preferably 15 minutes to 70 minutes, even more preferably 30 minutes to 60 minutes.

Preferably, the average residence time in the reactor R1 is $t_{RT-1}$, and the ratio of the oscillation period $t_{OP-1}$ to the average residence time $t_{RT-1}$ is in the range of 0.2 to 2.0, more preferably 0.25 to 1.0.

In general, the average residence time is defined as the ratio of the reaction volume $V_R$ to the volumetric outflow rate from the reactor $Q_o$ (i.e. $V_R/Q_o$). In case of a loop reactor or a liquid-filled continuous stirred tank reactor (CSTR), VR equals to the reactor volume; in case of a normal CSTR, it equals to the volume of the slurry within the reactor.

Preferably, the oscillation period $t_{OP-prepoly}$ of the varying hydrogen feed to the prepolymerisation reactor is from 10 minutes to 60 minutes, more preferably 10 minutes to 40 minutes.

Preferably, the average residence time $t_{RT-prepoly}$ in the prepolymerisation reactor is from 2 minutes to 60 minutes, more preferably 5 minutes to 30 minutes, even more preferably 10 minutes to 25 minutes.

Preferably, the average residence time in the prepolymerisation reactor is $t_{RT-prepoly}$, and the ratio of the oscillation period $t_{OP-prepoly}$ to the average residence time $t_{RT-prepoly}$ is in the range of 0.5 to 3.0, more preferably 0.8 to 2.0.

Preferably, the maximum hydrogen to propylene feed ratio to the reactor R1 and/or the prepolymerisation reactor is from 0.02 to 1.5 mol/kmol, more preferably 0.05 to 0.8 mol/kmol, even more preferably 0.05 to 0.55 mol/kmol and the minimum hydrogen to propylene feed ratio to the reactor R1 and/or the prepolymerisation reactor is preferably from 0 mol/kmol to 50% of the maximum hydrogen to propylene feed ratio, more preferably from 0 mol/kmol to 25% of the maximum hydrogen to propylene feed ratio, even more 0 mol/kmol.

As already indicated above, the first fraction has a melt flow rate MFR (2.16 kg, 230° C.) which is lower than the melt flow rate MFR (2.16 kg, 230° C.) of the final propylene homo- or copolymer. This means that in the reactor R1 a polymer fraction of higher molecular weight is prepared whereas in at least one of the subsequent process steps a polymer fraction of lower molecular weight is prepared so as to reduce the MFR (2.16 kg, 230° C.) value of the final composition below the MFR (2.16 kg, 230° C.) value of the first fraction. As discussed above, if a prepolymerisation step is used, the first fraction also includes the propylene prepolymer prepared in the prepolymerisation reactor and subsequently transferred to the reactor R1.

Preferably, the first fraction has a melt flow rate MFR (2.16 kg, 230° C.) within the range of 0.005 g/10 min to 15 g/10 min, more preferably 0.01 g/10 min to 5.0 g/10 min, even more preferably 0.05 g/10 min to 1.0 g/10 min.

Preferably, the first fraction has a weight average molecular weight Mw within the range of 150000 to 2500000 g/mol, more preferably 250000 to 2000000 g/mol, even more preferably 400000 to 1000000 g/mol.

Preferably, the ratio of the melt flow rate MFR (2.16 kg, 230° C.) of the first fraction to the melt flow rate MFR (2.16 kg, 230° C.) of the final propylene homo- or copolymer is from 0.01 to 0.9, more preferably from 0.05 to 0.8, even more preferably from 0.1 to 0.7.

In reactor R1, any catalyst commonly known for the preparation of polypropylene can be used. Preferred catalysts include Ziegler-Natta catalysts and single site catalysts such as metallocene-containing catalysts.

Preferably, the catalyst in the reactor R1 is a Ziegler-Natta catalyst.

Typically, a Ziegler-Natta catalyst comprises a solid transition metal component and a cocatalyst. The solid transition metal component preferably comprises a magnesium halide and a transition metal compound. These compounds may be supported on a particulate support, such as inorganic oxide, like silica or alumina, or the magnesium halide itself may form the solid support. Examples of such catalysts are disclosed e.g. in WO 87/07620, WO 92/21705, WO 93/11165, WO 93/19100, WO 97/36939, WO 98/12234, WO 99/33842, WO 03/000757, WO 03/000754, and WO 2004/029112.

In addition to the magnesium halide and transition metal compound, the solid transition metal component usually also comprises an electron donor (internal electron donor). Suitable electron donors are, among others, esters of carboxylic acids, like phthalates, citraconates, and succinates. Also oxygen- or nitrogen-containing silicon compounds may be used. Examples of suitable compounds are disclosed in WO 92/19659, WO 92/19653, WO 92/19658, U.S. Pat. No. 4,347, 160, U.S. Pat. No. 4,382,019, U.S. Pat. No. 4,435,550, U.S. Pat. No. 4,465,782, U.S. Pat. No. 4,473,660, U.S. Pat. No. 4,530,912, and U.S. Pat. No. 4,560,671.

Preferred solid catalyst components are disclosed in WO 2004/029112. In a preferred embodiment of the present invention, the solid catalyst component is prepared by a process comprising the following steps: (i) preparing a solution of a magnesium complex by reacting an alkoxy magnesium compound and an electron donor or precursor thereof in a $C_6$ to $C_{10}$ aromatic liquid reaction medium, (ii) reacting said magnesium complex with a compound of at least one fourvalent Group 4 metal at a temperature greater than 10° C. and less than 60° C. to produce an emulsion of a denser, $TiCl_4$/toluene-insoluble, oil dispersed phase having Group 4 metal/Mg molar ratio of 0.1 to 10 in an oil disperse phase having Group 4 metal/Mg molar ratio of 10 to 100, (iii) agitating the emulsion, optionally in the presence of an emulsion stabilizer and/or a turbulence minimizing agent, in order to maintain the droplets of said dispersed phase within an average size range of 5 to 200 μm. The catalyst particles are obtained after solidifying said particles of the dispersed phase by heating. In said process, an aluminium alkyl compound of the formula $AlR_{3-n}X_n$, where R is an alkyl group of 1 to 20, preferably 1 to 10 carbon atoms, X is a halogen and n is 0, 1, 2 or 3, may be added and brought into contact with the droplets of the dispersed phase of the agitated emulsion before recovering the solidified particles.

The cocatalyst used in combination with the transition metal compound typically comprises an aluminium alkyl compound. The aluminium alkyl compound is preferably trialkyl aluminium such as trimethylaluminium, triethylaluminium, tri-isobutylaluminium, or tri-n-octylaluminium. However, it may also be an alkylaluminium halide, such as diethylaluminium chloride, dimethylaluminium chloride, and ethylaluminium sesquichloride. It may also be an alumoxane, such as methylalumoxane (MAO), tetraisobutylalumoxane (TIBAO) or hexaisobutylalumoxane (HIBAO). Triethylaluminium and tri-isobutylaluminium are especially preferred.

Preferably, the cocatalyst also comprises an external donor. Suitable electron donors known in the art include ethers, ketones, amines, alcohols, phenols, phosphines, and silanes. Examples of these compounds are given, among others, in WO 95/32994, U.S. Pat. No. 4,107,414, U.S. Pat. No. 4,186, 107, U.S. Pat. No. 4,226,963, U.S. Pat. No. 4,347,160, U.S. Pat. No. 4,382,019, U.S. Pat. No. 4,435,550, U.S. Pat. No. 4,465,782, U.S. Pat. No. 4,472,524, U.S. Pat. No. 4,473,660, U.S. Pat. No. 4,552,930, U.S. Pat. No. 4,530,912, U.S. Pat. No. 4,532,313, U.S. Pat. No. 4,560,671, and U.S. Pat. No. 4,657,882. Electron donors consisting of organosilane compounds, containing Si—OCOR, Si—OR, or Si—$NR_2$ bonds, having silicon as the central atom, and R is an alkyl, alkenyl, aryl, arylalkyl or cycloalkyl with 1 to 20 carbon atoms are known in the art and are especially preferred. Such compounds are described in U.S. Pat. No. 4,472,524, U.S. Pat. No. 4,522,930, U.S. Pat. No. 4,560,671, U.S. Pat. No. 4,581,342, U.S. Pat. No. 4,657,882, EP 0 045 976 and EP 0 045 977.

The catalyst may also be pretreated, such as prepolymerised so that it contains up to 5 g of prepolymer per gram of solid catalyst component. For example, the catalyst may contain one or two grams of poly(vinylcyclohexane) per gram of solid catalyst component. This allows the preparation of nucleated polypropylene as disclosed in EP 0607703, EP 1028984, EP 1028985, and EP 1030878.

Preferably, the reactor R1 is a slurry reactor, preferably a loop reactor.

The loop reactor can be operated under usual conditions known to the skilled person. Preferably, the loop reactor is operated at a temperature of 65 to 90° C., more preferably 68 to 80° C., and a pressure of 20 to 80 bar, more preferably 35 to 60 bar.

If a prepolymerisation step is carried out in a prepolymerisation reactor before step (i), said prepolymerisation reactor is preferably operated at a temperature of 5 to 60° C., more preferably 20 to 60° C., and a pressure of 20 to 80 bar, more preferably 35 to 60 bar. As already indicated above, the prepolymerisation reactor is preferably a continuous stirred reactor. More preferably, the prepolymerisation reactor is a slurry reactor such as a loop reactor. However, other commonly used types of prepolymerisation reactors known to the skilled person can be used as well, e.g. a continuous stirred tank reactor (CSTR).

The reactor R2 can be any conventional type of polymerisation reactor commonly used in the preparation of polypropylene. Preferably, the reactor R2 is a gas phase reactor which can be operated under conditions commonly known to the skilled person. Preferably, the gas phase reactor is operated at a temperature of from 50 to 100° C., more preferably 70 to 90° C., and a pressure of from 15 to 35 bar, more preferably 18 to 30 bar.

Preferably, the hydrogen feed rate to the gas phase reactor is constant.

Preferably, the split between the reactor R1 and the reactor R2 is from 20/80 to 80/20, more preferably 30/70 to 70/30, and even more preferably 40/60 to 60/40.

Preferably, the reactor blend of step (iv) comprising the first and second fraction is transferred to a third reactor, preferably a gas phase reactor, in which a third fraction of the propylene homo- or copolymer is prepared.

According to another aspect, the present invention also provides a propylene homopolymer, having a melt flow rate MFR (2.16 kg, 230° C.) of from 0.005 to 15.0 g/10 min, a ratio of the weight average molecular weight Mw to the number average molecular weight Mn (Mw/Mn) of from 4.5 to 10, and a tensile modulus of at least 2250 MPa.

Preferably, the tensile modulus of the propylene homopolymer is measured on a sample which does not contain any additives, in particular no additives which result in an increased tensile strength such as nucleating agents, fillers etc. In other words, in a preferred embodiment, a sample consisting of the propylene homopolymer is used for the measurement of tensile modulus.

For all other properties such as MFR (2.16 kg, 230° C.), the measurements can be made on samples which include optional additives or on samples consisting of the propylene homopolymer.

Preferably, the propylene homopolymer has a weight average molecular weight Mw of from 280,000 g/mol to 1,000,000 g/mol, more preferably 300,000 g/mol to 600,000 g/mol.

Preferably, Mw/Mn of the propylene homo- or copolymer is from 4.5 to 8, more preferably 5 to 8.

According to a further aspect, the present invention provides a pipe, comprising the propylene homopolymer as defined above.

EXAMPLES

1. Measuring Methods

The following measuring methods apply to the properties discussed above and still to be discussed below.

1.1 Mw, Mn, MWD

Weight average molecular weight (Mw), number average molecular weight (Mn) and thus molecular weight distribution (MWD=Mw/Mn) were determinated by size exclusion chromatography (SEC) based on standard test methods ISO 16014-2:2003 and ISO 16014-4:2003.

The molecular weight averages and molecular weight distribution were measured on a Waters Alliance GPCV2000 SEC instrument with on-line viscometer at 140 degrees Celsius using 1,2,4-trichlorobenzene (TCB) stabilized with 2,6-di-tert-butyl-4-methylphenol (BHT) as an eluent. A set of two mixed beds and one 107 Å TSK-Gel columns from TosoHaas was used and the system was calibrated with NMWD polystyrene standards (from Polymer laboratories).

1.2 Melt Flow Rate MFR

Melt flow rate was measured according to ISO 1133, either at 230° C. and 2.16 kg (MFR (2.16 kg, 230° C.)), at 230° C. and 5 kg (MFR (5 kg, 230° C.)), or at 230° C. and 10 kg (MFR (10 kg, 230° C.)).

1.3 Tensile Strength

Tensile strength properties were determined according to ISO 527-2. Injection moulded specimens were used, which were prepared according to ISO 1873-2 and ISO 294-1.

1.3.1 Strain at Yield

Strain at yield (in %) was determined according to ISO 527-2. The measurement was conducted at 23° C. with an elongation rate of 50 mm/min.

1.3.2 Stress at Yield

Stress at yield (in MPa) was determined according to ISO 527-2. The measurement was conducted at 23° C. with an elongation rate of 50 mm/min.

1.3.3 Tensile Modulus

Tensile modulus (in MPa) was determined according to ISO 527-2. The measurement was conducted at 23° C. with an elongation rate of 1 mm/min.

1.3.4 Tensile Break

Tensile break was determined according to ISO 527-2. The measurement was conducted at 23° C. with an elongation rate of 50 mm/min.

1.4 Flexural Modulus

Flexural modulus was determined according to ISO 178. The test specimens were 80×10×4.0 mm (length×width×thickness). The length of the span between the supports was 64 mm, the test speed was 2 mm/min and the force was 100 N.

2. Examples CE1 and IE 1 to 6

The catalyst used in Examples CE1 and IE 1 to 6 was prepared as follows: First, 0.1 mol of MgCl2×3 EtOH was suspended under inert conditions in 250 ml of decane in a reactor at atmospheric pressure. The solution was cooled to −15° C. and 300 ml of cold TiCl4 was added while maintaining the temperature at said level. Then, the temperatury of the slurry was increased slowly to 20° C. At this temperature, 0.02 mol of dioctylphthalate (DOP) was added to the slurry. After addition of phthalate, the temperature was raised to 135° C. during 90 minutes and the slurry was allowed to stand for 60 minutes. Then, another 300 ml of TiCl4 was added and the temperature was kept at 135° C. for 120 minutes. After this, the catalyst was filtered from the liquid and washed six times with 300 ml heptane at 80° C. Then, the solid catalyst component was filtered and dried. The obtained solid contained 1.9 wt % of titanium.

After the preparation of the solid component, the catalyst was prepolymerised with vinylcyclohexane as follows:

The solid catalyst component was suspended in Drakeol 35 oil, supplied by Penreco, to produce a catalyst slurry containing 22.6 wt % solids. Triethylaluminium and dicyclopentyldimethoxysilane (DCPDMS) were then added to the slurry so that the molar ratio Al/Ti was 1.4 mol/mol and the molar ratio of triethylaluminium to DCPDMS was 7 mol/mol. Then, vinylcyclohexane was added to the slurry in such an amount that the weight ratio of the vinylcyclohexane to the solid catalyst component was 1/1. The mixture was agitated and allowed to react until the content of the unreacted vinylcyclohexane in the reaction mixture was about 1000 ppm. The prepolymerised catalyst was then filtered and mixed with fresh Drakeol 35 to reach a catalyst concentration of 22 wt %, calculated as solid transition metal component in oil.

In examples IE1 to IE6, a periodically varying hydrogen feed was used whereas in comparative example CE1 the hydrogen feed was kept constant. These example will now be described in further detail.

Comparative Example CE1

A stirred tank reactor having a volume of 15 dm$^3$ was operated at a temperature of 40° C. and a pressure of 57 bar as a prepolymerisation reactor. The propylene feed was adjusted so that the average residence time in the reactor was 0.32 hours. All hydrogen was fed into the prepolymerisation reactor at a constant feed rate. From the prepolymerisation reactor, hydrogen was carried over into the loop reactor. Triethylaluminium (TEA) was used as an activator and dicyclopentyldimethoxysilane (DCPDMS) as an external donor. The amount of triethylaluminium feed was 200 g per 1000 kg of propylene and the molar ratio of TEA to DCPDMS was 4. The molar ratio of TEA to titanium in the solid catalyst component was 282 mol/mol.

The slurry from the prepolymerisation reactor was directed into a loop reactor having a volume of 150 dm$^3$ and which was operated at 85° C. and 55 bar. Into the loop reactor, additional propylene was also introduced so that the average residence time was 0.81 hours. The hydrogen feed rate into the prepolymerisation reactor was adjusted so that its ratio to total propylene feed into the loop and prepolymerisation reactors was 0.025 mol/kmol. Polymer production rate in the loop reactor was 13 kg/h, representing 29 wt % of the total polymer produced in the loop and gas phase reactors. The resulting polymer had an MFR$_{10}$ of 0.39 g/10 min, an MFR$_2$ of 0.03 g/10 min and the fraction of xylene soluble polymer was 1.9 wt %.

The slurry from the loop reactor was directly conducted into a fluidised bed gas phase reactor, operated at a temperature of 95° C. and a pressure of 27 bar. Additional propylene and hydrogen were fed at a constant feed rate so that the ratio of hydrogen to propylene in the recycle gas was 180 mol/kmol and the content of propylene was 75 mol %. Nitrogen was fed as an inert gas for flushing purposes. The polymer production rate was 35 kg/h, representing 71% of the total polymer. The resulting polymer had an $MFR_2$ of 1.0 g/10 min and the fraction of xylene soluble polymer was 1.5 wt %.

The resulting polymer was stabilised with 6000 ppm of Irganox B 225 and 700 ppm of calcium stearate and extruded to pellets. These types of additives have more or less no impact on tensile modulus. The resulting pellets had an $MFR_2$ of 1.3 g/10 min.

Inventive Example IE1

The procedure of CE1 was otherwise repeated but hydrogen was fed periodically in a total period of 20 minutes. For 15 minutes, the hydrogen feed was shut so that the feed was 0, and for 5 minutes the feed rate was kept at a level of 0.2 g/h. This cycle was repeated during the duration of the run. Polymer production rate in the loop reactor was 17.5 kg/h. Further conditions are shown in Table 1.

The resulting polymer was stabilised with 6000 ppm of Irganox B 225 and 700 ppm of calcium stearate and extruded to pellets. These types of additives have more or less no impact on tensile modulus. The resulting pellets had an $MFR_2$ of 1.3 g/10 min.

Inventive Example IE2

The procedure of IE1 was repeated except that the maximum hydrogen feed was set to 0.3 g/h. Polymer production rate in the loop reactor was 17 kg/h. Further conditions are shown in Table 1.

Inventive Example IE3

A stirred tank reactor having a volume of 15 $dm^3$ was operated at a temperature of 50° C. and a pressure of 57 bar as a prepolymerisation reactor. The propylene feed was adjusted so that the average residence time in the reactor was 0.32 hours. All hydrogen was fed into the prepolymerisation reactor periodically so that the hydrogen feed was 0 for a period of 15 minutes and 0.3 g/h for 5 minutes. From the prepolymerisation reactor, hydrogen was carried over into the loop reactor.

Triethylaluminium (TEA) was used as an activator and dicyclopentyldimethoxysilane (DCPDMS) as an external donor. The amount of triethylaluminium feed was 200 g per 1000 kg of propylene and the molar ratio of TEA to DCPDMS was 4. The molar ratio of TEA to titanium in the solid catalyst component was 237 mol/mol.

The slurry from the prepolymerisation reactor was directed into a loop reactor having a volume of 150 $dm^3$ and which was operated at 85° C. and 55 bar. Into the loop reactor, additional propylene was also introduced so that the average residence time was 0.82 hours. The average ratio of hydrogen feed to the total propylene feed into the loop and prepolymerisation reactors was 0.015 mol/kmol. Polymer production rate in the loop reactor was 15 kg/h, representing 21 wt % of the total polymer produced in the loop and the two gas phase reactors. The resulting polymer had an $MFR_{10}$ of 0.30 g/10 min, an $MFR_2$ of 0.02 g/10 min and the fraction of xylene soluble polymer was 1.8 wt %.

The slurry from the loop reactor was directly conducted into a fluidised bed gas phase reactor, operated at a temperature of 95° C. and a pressure of 27 bar. Additional propylene and hydrogen were fed at a constant feed rate so that the ratio of hydrogen to propylene in the recycle gas was 177 mol/kmol and the content of propylene was 74 mol %. Nitrogen was fed as an inert gas for flushing purposes. The polymer production rate was 49 kg/h, representing 66% of the total polymer. The resulting polymer had an $MFR_2$ of 0.81 g/10 min and the fraction of xylene soluble polymer was 1.6 wt %.

The polymer was withdrawn from the gas phase reactor described above and directed to another gas phase reactor operated at a temperature of 95° C. and a pressure of 30 bar. Additional propylene was fed so that the content of propylene in the recycle gas was 66 mol %. Nitrogen was fed as an inert gas for flushing purposes. The polymer production rate was 10 kg/h, representing 13% of the total polymer. The resulting polymer had an $MFR_2$ of 0.69 g/10 min and the fraction of xylene soluble polymer was 1.6 wt %.

The resulting polymer was stabilised with 6000 ppm Irganox B 225 and 700 ppm calcium stearate and extruded to pellets. The resulting pellets had an $MFR_2$ of 1.3 g/10 min.

Inventive Example IE4

The procedure of IE3 was repeated except that the period was 35 minutes so that the feed was 0 for 30 minutes and 0.4 g/h for 5 minutes. Polymer production rate in the loop reactor was 17 kg/h. Further conditions are shown in Table 1.

Inventive Example IE5

The procedure of IE4 was repeated except that the conditions were as shown in Table 1. Polymer production rate in the loop reactor was 14 kg/h.

Inventive Example IE6

The procedure of IE4 was repeated except that the conditions were as shown in Table 1. Polymer production rate in the loop reactor was 16.6 kg/h.

TABLE 1

| Polymerisation conditions and polymer properties | | | | | | | |
|---|---|---|---|---|---|---|---|
| Example | CE1 | IE1 | IE2 | IE3 | IE4 | IE5 | IE6 |
| Prepolymerisation | | | | | | | |
| Temperature, ° C. | 40 | 40 | 50 | 50 | 55 | 56 | 40 |
| Average residence time, h | 0.32 | 0.32 | 0.32 | 0.32 | 0.32 | 0.32 | 0.29 |
| Loop | | | | | | | |
| Temperature, ° C. | 85 | 85 | 85 | 85 | 85 | 85 | 85 |
| H2/C3, avg, mol/kmol | 0.025 | 0.011 | 0.010 | 0.015 | 0.008 | 0.009 | 0.011 |
| Oscillation period, h | — | 0.33 | 0.33 | 0.33 | 0.58 | 0.58 | 0.58 |
| Avg. residence time, h | 0.81 | 0.73 | 0.76 | 0.82 | 0.98 | 0.9 | 0.60 |

TABLE 1-continued

Polymerisation conditions and polymer properties

| Example | CE1 | IE1 | IE2 | IE3 | IE4 | IE5 | IE6 |
|---|---|---|---|---|---|---|---|
| Ratio of oscillation period to avg. res. time | — | 0.45 | 0.43 | 0.40 | 0.59 | 0.64 | 0.97 |
| Split, % | 29 | 29 | 27 | 21 | 22 | 19 | 22 |
| MFR10, g/10 min[1] | 0.39 | 0.26 | 0.30 | 0.30 | 0.25 | 0.23 | 0.37 |
| MFR2, g/10 min[1] | 0.026 | 0.017 | 0.020 | 0.020 | 0.017 | 0.015 | 0.025 |
| XS, % | 1.9 | 2.0 | 2.1 | 1.8 | 1.9 | 1.9 | 1.9 |
| Gas phase reactor 1 | | | | | | | |
| Temperature, °C. | 95 | 98 | 98 | 95 | 95 | 95 | 98 |
| H2/C3, mol/kmol | 180 | 193 | 183 | 177 | 180 | 178 | 204 |
| Avg. residence time, h | 2.3 | 2.1 | 1.9 | 1.5 | 1.5 | 1.5 | 3.4 |
| Split, % | 71 | 71 | 73 | 66 | 60 | 64 | 49 |
| MFR2, g/10 min[1] | 1.0 | 1.0 | 1.1 | 0.81 | 0.54 | 0.40 | 1.0 |
| XS, % | 1.5 | 1.7 | 1.7 | 1.6 | 1.6 | 1.6 | 1.7 |
| Gas phase reactor 2 | | | | | | | |
| Temperature, °C. | — | — | — | 95 | 95 | 95 | 95 |
| H2/C3, mol/kmol | — | — | — | 0 | 0 | 0 | 200 |
| Avg. residence time, h | — | — | — | 1.2 | 1.3 | 1.3 | 1.3 |
| MFR2, g/10 min[1] | — | — | — | 0.69 | 0.44 | 0.30 | 1.4 |
| XS, % | — | — | — | 1.6 | 1.5 | 1.5 | 1.7 |
| Final polymer | | | | | | | |
| MFR2, g/10 min[2] | 1.3 | 1.0 | 1.0 | 0.55 | 0.38 | 0.46 | 1.5 |
| XS, % | 1.6 | 1.9 | 1.8 | 1.7 | 1.7 | 1.6 | 1.8 |
| Tensile modulus, MPa[3] | 2200 | 2293 | 2329 | 2331 | 2276 | 2269 | 2352 |
| Stress at break, MPa | 13 | 20 | 20 | 17 | 31 | 16 | 19 |
| Strain at break, % | 72 | 46 | 43 | 54 | 18 | 67 | 55 |
| Tensile strength, MPa | 42 | 43 | 43 | 43 | 43 | 43 | 43 |
| Flexural modulus, MPa | 2019 | 2098 | 2138 | 2134 | 2122 | 2129 | 2115 |

[1] Measured on the polymer powder taken from the reactor. If e.g. taken from the first gas phase reactor, the polymer is made of the fractions from the prepolymerisation reactor, the loop reactor and the first gas phase reactor.
[2] Measured on the final propylene polymer composition including the additives.
[3] The tensile modulus measured on test samples of the final polymer is more or less identical to a test sample made of the polymer without additives, as the final polymers of the examples only include additives which have no impact on tensile modulus (Irganox B and stearate, see above).

As can be seen from Table 1, the values for tensile modulus and flexural modulus of the polymers made by the process of the present invention are clearly higher than the values obtained in the comparative example CE1. This means that by using the process of the present invention, a stiffer product can be obtained.

We claim:

1. A process for the preparation of a propylene homo- or copolymer, comprising the following steps:
   (i) feeding propylene and hydrogen, and optionally one or more comonomers, to a reactor R1, wherein the hydrogen is fed to the reactor R1 in a periodically varying amount,
   (ii) preparing a first fraction of the propylene homo- or copolymer in the reactor R1 in the presence of a catalyst,
   (iii) transferring the first fraction to a reactor R2, and
   (iv) preparing a second fraction of the propylene homo- or copolymer in the reactor R2,
wherein the melt flow rate MFR (2.16 kg, 230° C.) of the propylene homo- or copolymer is higher than the melt flow rate MFR (2.16 kg, 230° C.) of the first fraction,
wherein a prepolymerisation step in a prepolymerisation reactor, preferably a loop reactor, is carried out before step (i), which includes feeding propylene and hydrogen to the prepolymerisation reactor, wherein the hydrogen feed is provided in a periodically varying amount.

2. The process according to claim 1, wherein the hydrogen fed to the reactor R1 is exclusively provided from the prepolymerisation reactor.

3. The process according to claim 1, wherein the amount of hydrogen in the feed stream(s) to the prepolymerisation reactor and/or the reactor R1 varies/vary as a function of time in the form of a non-sinusoidal function, preferably in the form of a sawtooth function, a triangle function, a rectangular function, one or more pulse functions, one or more step functions, or any combination thereof; or in the form of a sinusoidal function.

4. The process according to claim 1, wherein the hydrogen is fed to the reactor R1 and/or the prepolymerisation reactor pulse-wise, and wherein within a periodic cycle, the duration of the hydrogen pulse is $t_p$ and the duration of the hydrogen zero feed is $t_{zf}$ and $t_p < t_{zf}$, more preferably $t_p$ and $t_{zf}$ satisfy the following relationship: $1/30 \leq (t_p/t_{zf}) < 1$.

5. The process according to claim 1, wherein the oscillation period $t_{OP-1}$ of the varying hydrogen feed to the reactor R1 is from 10 minutes to 60 minutes.

6. The process according to claim 1, wherein the average residence time in the reactor R1 is $t_{RT-1}$, and the ratio of the oscillation period $t_{OP-1}$ to the average residence time $t_{RT-1}$ is in the range of 0.2 to 2.0.

7. The process according to claim 1, wherein the oscillation period $t_{OP-prepoly}$ of the varying hydrogen feed to the prepolymerisation reactor is from 10 minutes to 60 minutes.

8. The process according to claim 1, wherein the average residence time in the prepolymerisation reactor is $t_{RT-prepoly}$, and the ratio of the oscillation period $t_{OP-prepoly}$ to the average residence time $t_{RT-prepoly}$ is in the range of 0.5 to 3.0.

9. The process according to claim 1, wherein the maximum hydrogen to propylene feed ratio to the reactor R1 and/or the prepolymerisation reactor is from 0.02 to 1.5 mol/kmol, and the minimum hydrogen to propylene feed ratio to the reactor R1 and/or the prepolymerisation reactor is from 0 mol/kmol to 50% of the maximum hydrogen to propylene feed ratio.

10. The process according to claim 1, wherein the first fraction has a melt flow rate MFR (2.16 kg, 230° C.) within the range of 0.005 g/10 min to 15 g/10 min.

11. The process according to claim 1, wherein the ratio of the melt flow rate MFR (2.16 kg, 230° C.) of the first fraction to the melt flow rate MFR (2.16 kg, 230° C.) of the propylene homo- or copolymer is from 0.01 to 0.9.

12. The process according to claim 1, wherein the catalyst in the reactor R1 is a Ziegler-Natta catalyst.

13. The process according to claim 1, wherein the reactor R1 is a slurry reactor, preferably a loop reactor.

14. The process according to claim 1, wherein the reactor R2 is a gas phase reactor.

15. The process according to claim 1, wherein the reactor blend of step (iv) is transferred to a reactor R3, preferably a gas phase reactor, in which a third fraction of the propylene homo- or copolymer is prepared.

16. The process according to claim 1, wherein the oscillation period $t_{OP-1}$ of the varying hydrogen feed to the reactor R1 is from 10 minutes to 40 minutes.

17. The process according to claim 1, wherein the average residence time in the reactor R1 is $t_{RT-1}$, and the ratio of the oscillation period $t_{OP-1}$ to the average residence time $t_{RT-1}$ is in the range of 0.25 to 1.0.

18. The process according to claim 1, wherein the oscillation period $t_{OP-prepoly}$ of the varying hydrogen feed to the prepolymerisation reactor is from 10 minutes to 40 minutes.

19. The process according to claim 1, wherein the average residence time in the prepolymerisation reactor is $t_{RT-prepoly}$, and the ratio of the oscillation period $t_{OP-prepoly}$ to the average residence time $t_{RT-prepoly}$ is in the range of 0.8 to 2.0.

20. The process according to claim 1, wherein the maximum hydrogen to propylene feed ratio to the reactor R1 and/or the prepolymerisation reactor is from 0.05 to 0.8 mol/kmol and the minimum hydrogen to propylene feed ratio to the reactor R1 and/or the prepolymerisation reactor is from 0 mol/kmol to 50% of the maximum hydrogen to propylene feed ratio.

21. The process according to claim 1, wherein the maximum hydrogen to propylene feed ratio to the reactor R1 and/or the prepolymerisation reactor is from 0.05 to 0.55 mol/kmol and the minimum hydrogen to propylene feed ratio to the reactor R1 and/or the prepolymerisation reactor is from 0 mol/kmol to 50% of the maximum hydrogen to propylene feed ratio.

22. The process according to claim 1, wherein the first fraction has a melt flow rate MFR (2.16 kg, 230° C.) within the range of 0.01 g/10 min to 5.0 g/10 min.

23. The process according to claim 1, wherein the first fraction has a melt flow rate MFR (2.16 kg, 230° C.) within the range of 0.05 g/10 min to 1.0 g/10 min.

24. The process according to claim 1, wherein the ratio of the melt flow rate MFR (2.16 kg, 230° C.) of the first fraction to the melt flow rate MFR (2.16 kg, 230° C.) of the propylene homo- or copolymer is from 0.05 to 0.8.

25. The process according to claim 1, wherein the ratio of the melt flow rate MFR (2.16 kg, 230° C.) of the first fraction to the melt flow rate MFR (2.16 kg, 230° C.) of the propylene homo- or copolymer is from 0.1 to 0.7.

* * * * *